Patented Aug. 22, 1944

2,356,527

UNITED STATES PATENT OFFICE 2,356,527

MANUFACTURE OF CARPETS, LININGS, OR THE LIKE

Jean Mercier, Neuilly-sur-Seine, France; vested in the Alien Property Custodian

No Drawing. Application May 15, 1940, Serial No. 335,387. In France June 17, 1939

1 Claim. (Cl. 260—750)

The present invention relates to the manufacture of carpets, linings, or the like, consisting chiefly of rubber or the like, said linings being in particularly intended for making non-slipping surfaces, for instance for the running boards of motor vehicles, and, especially for certain portions of airplane wings.

As a matter of fact, in the last mentioned case, it is important that mechanics should be able to circulate, during flight, on the wings of an airplane, under the best possible conditions of safety, for instance for supervising the running of the engines or for performing any repairs as may become necessary immediately.

The object of the present invention is to provide a non-slipping lining of the type above described, which complies with the conditions above stated and which can be manufactured very easily and at a low cost.

According to the essential feature of the invention, I vulcanize a mixture including a rubber combination, of any type, either conventional or not, mixed with a certain amount of cereal straw, the latter being optionally divided into elements of relatively small size.

I have found that surfaces made of such a composition, in the form of linings, carpets, or the like, have non-slipping properties which are remarkable, especially when they are sprayed with or immersed in oil.

Other features of the present invention will result from the following detailed description of some specific embodiments thereof.

In order to obtain such a composition of matter, I proceed in the following manner:

I prepare the rubber composition in the form of coagulated resin, latex, or the like. The straw, which may have been preliminarily treated or not in order to give it any desired supplementary property, is cut into elements of suitable length, for example 1 centimeter. It should be well understood that straw stems can be employed, according to the invention, without so dividing it into elements, in its natural state. The straw is incorporated into the rubber composition. Then the whole is vulcanized according to the needs.

I will now describe an example of application of the method according to the invention:

The rubber liquid above referred to is of the following composition:

| | Parts in weight |
|---|---|
| Gum | 100 |
| Metallic zinc | 10 |
| Stearic acid | 1 |
| Litopone | 25 |
| Anti-oxidizing, accelerator, sulphur | 5 |

To this mixture, I add 75 parts in weight of cereal straw, divided into elements of approximately 1 centimeter.

The mixture is vulcanized for 30 minutes approximately, at a temperature of about 135° C.

Of course, the example above set forth has no limitative character.

The rubber that is employed may be either natural rubber or synthetic rubber, of any suitable type.

As above stated, the straw that is incorporated into the rubber composition may be either cut into elements or employed in its natural state, the stirring of the mixture of straw and rubber being pursued until the desired dispersion of the whole is obtained.

It is important to note that cereal straw is, as a rule, impervious to water, and, accordingly, it can be employed, in the mixture above set forth without subjecting it to any preliminary waterproofing treatment. This is a great difference with what happens, for instance in the case of wood. As a matter of fact, wood, in order to be employed in admixture to a rubber composition, must necessarily be crushed or cut into small shavings, or reduced to the state of saw dust. But the shavings or saw dust thus obtained are highly hydroscopic, and therefore necessitate a supplementary drying treatment before being introduced into the rubber composition. Such a treatment is avoided with the method according to the present invention, which makes use of straw.

Of course, the straw to be incorporated into the mixture can be subjected to any desired treatment, as above mentioned, for instance for making it fire-proof or protecting it against the attack of fat and oil. Such a treatment can be, for instance, effected, by means of borax, ammonium nitrate, and similar products.

Of course, the invention covers the mats, carpets, linings obtained from matter made according to the method above set forth.

In a general manner, while I have, in the above description, disclosed what I deem to be practical and efficient embodiments of the present invention, it should be well understood that I do not wish to be limited thereto as there might be changes made in the accessory steps of the method without departing from the principle of the present invention as comprehended within the scope of the appended claim.

What I claim is:

A composition of matter, having non-slip properties when wet with oil, which contains cut cereal straw in length of approximately 1 cm. embodied in a mass of vulcanized rubber, the proportion of straw in the composition being approximately 30 per cent by weight said straw being non-hygroscopic in character.

JEAN MERCIER.